J. G. Baker,
Grinding Saws.
N° 54,813.
Patented May 15, 1866.
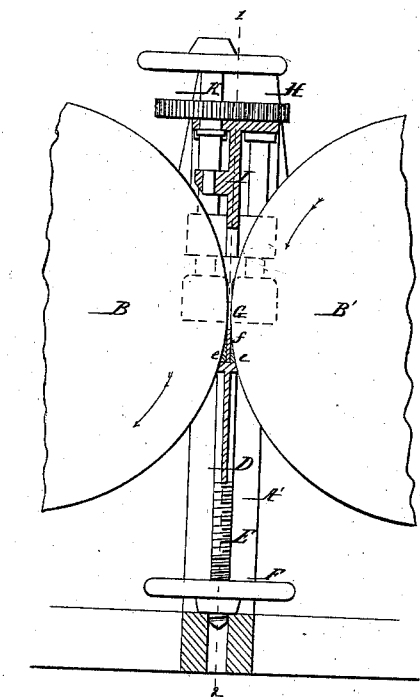
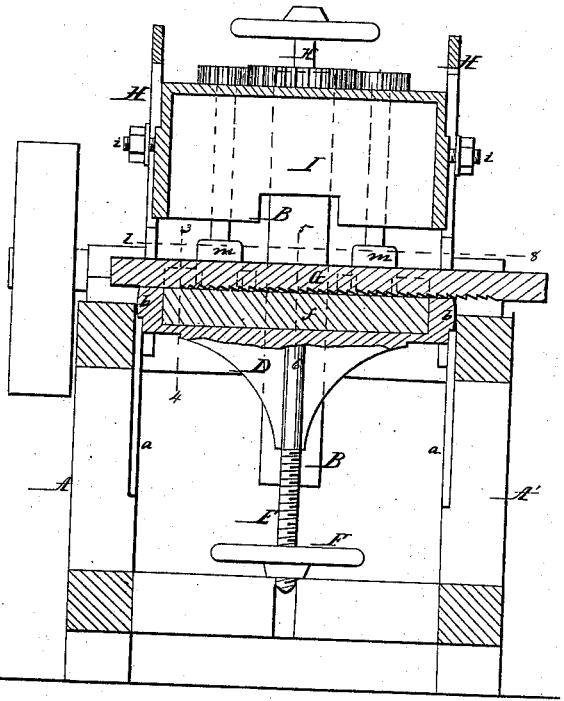
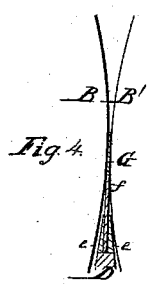
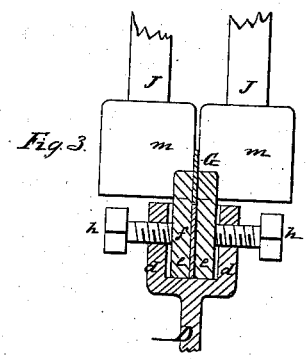
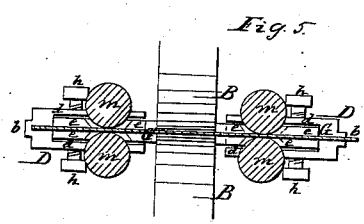
Witnesses:
W<sup>m</sup> Albert Steel
John Parker
Inventor:
J. G. Baker
By his Att'y
H. Howson

UNITED STATES PATENT OFFICE.

JOHN G. BAKER, OF PHILADELPHIA, PENNSYLVANIA, ASSIGNOR TO HENRY DISSTON, OF SAME PLACE.

IMPROVEMENT IN SAW-GRINDING MACHINES.

Specification forming part of Letters Patent No. 54,813, dated May 15, 1866.

*To all whom it may concern:*

Be it known that I, JOHN G. BAKER, of Philadelphia, Pennsylvania, have invented an Improved Saw-Grinding Machine; and I do hereby declare the following to be a full, clear, and exact description of the same, reference being had to the accompanying drawings, and to the letters of reference marked thereon.

My invention consists of certain mechanism, fully described hereafter, for rapidly grinding narrow saw-blades and reducing them to a proper taper.

In order to enable others skilled in this class of machinery to make and use my invention, I will now proceed to describe its construction and operation.

On reference to the accompanying drawings, which form a part of this specification, Figure 1 is a vertical section of sufficient of the machine to illustrate my invention; Fig. 2, a transverse section on the line 1 2, Fig. 1; Fig. 3, a section on the line 3 4, Fig. 2, drawn to an enlarged scale; Fig. 4, a section on the line 5 6; and Fig. 5 a sectional plan on the line 7 8, Fig. 2.

Similar letters refer to similar parts throughout the several views.

A and A' are the opposite side frames of the machine, in which turn two spindles, each carrying a grindstone, the two stones B B' (parts only of which are seen in Fig. 1) being caused to revolve in the direction pointed out by their respective arrows.

To grooves $a\ a$ in the opposite side frames are adapted the ends $b\ b$ of a frame, D, which is situated immediately below that point where the peripheries of the two grindstones are nearest to each other, a screw-rod, E, being secured at a central point to the frame, and the threads of the screw being adapted to those of a nut formed by the hub of the hand-wheel F, so that by turning the latter the frame can be elevated or lowered at pleasure. At each side of the frame D are two lugs, $d\ d$, between which are two packing-pieces, $e\ e$, and between the latter a strip of metal, $f$, of the same thickness as, or a trifle thicker than, the saw-blade G, the latter resting toothed edge downward on the strip $f$, which, together with the packing-pieces $e\ e$, is securely held between the lugs by set-screws $h\ h$, as best observed on reference to Fig. 3. The packing-pieces thus serve to guide the saw-blade laterally, while it is maintained in its proper vertical position by the strip $f$.

To the opposite side frames of the machine are secured the two guide-plates H and H', in which a cross-head, I, is arranged to slide vertically, and to which it can be secured after adjustment by screws $i$ and nuts.

In the cross-head turn four vertical spindles, J, two on each side of the saw-blade, against which friction-pulleys $m\ m$ (with one of which each spindle is furnished) bear, as seen in Fig. 3. A fifth vertical spindle, K, is also arranged to turn in the cross-head, and the latter spindle is geared to the others by means of such a system of wheels that on turning the spindle K the four spindles J will so revolve as to have a simultaneous tendency to cause the saw-blade to traverse in one direction or the other, according to that in which the spindle K may be turned.

The frame D and cross-head I having been adjusted to the desired position, the saw-blade is inserted between the packing-pieces $e\ e$ from one side of the machine and between the first pair of pulleys $m\ m$, after which the blade is released and gradually fed forward between the two stones by turning the spindle K, the opposite sides of the blade being thus simultaneously ground by the combined action of the two stones.

It will be observed that the frame D is cut away in the middle, so as not to interfere with the action of the stones on the blade The supporting-plate $f$ must of necessity be ground to some extent; but it can be readily replaced by a new plate, as circumstances require.

The importance of the packing-pieces $e\ e$ will be understood when it is borne in mind that saw-blades of different thickness have to be subjected to the machine, and consequently supporting-strips $f$, of different thickness to suit that of the saws, must be introduced between the packing-pieces.

Saw-blades have generally to be so tapered as to be thicker at the cutting-edge than at the back edge, and this taper can be readily obtained in the above-described machine by the vertical adjustment of the frame D, for the amount of taper imparted to the blade will depend upon its vertical position in relation to a horizontal line, z z, drawn between the centers of the two stones.

The cross-head I and its spindles can be readily adjusted to suit the position of the frame D.

I claim as my invention and desire to secure by Letters Patent—

1. The vertically-adjustable frame D, for holding the saw, in combination with the two grindstones B and B', the whole being arranged and operating substantially as set forth, for the purpose specified.

2. The frame D, its detachable packing-pieces e e, and detachable strip f, the whole being arranged for supporting and guiding the saw-blade, substantially as described, for the purpose specified.

3. The combination of the adjustable frame D with the adjustable cross-head I, its spindles J, and the friction-pulleys m.

In testimony whereof I have signed my name to this specification in the presence of two subscribing witnesses.

JOHN G. BAKER.

Witnesses:
HENRY HOWSON,
JOHN WHITE.